(12) United States Patent
Brodale et al.

(10) Patent No.: US 6,917,930 B1
(45) Date of Patent: Jul. 12, 2005

(54) DATABASE INTEGRITY IN AN INTERNET E-COMMERCE ENVIRONMENT

(75) Inventors: Michelle M. Brodale, Sunnyvale, CA (US); Roger Schuelke, Cupertino, CA (US)

(73) Assignee: Amdocs Software Systems Limited, Dublin (IE)

( * ) Notice: Subject to any disclaimer, the term of this patent is extended or adjusted under 35 U.S.C. 154(b) by 344 days.

(21) Appl. No.: 09/717,520

(22) Filed: Nov. 20, 2000

(51) Int. Cl.[7] .............................................. G06F 17/30
(52) U.S. Cl. ............................ 707/2; 707/10; 707/100; 707/104.1; 709/203
(58) Field of Search ......................... 707/1–3, 10, 100, 707/104.1; 709/203; 711/111, 112

(56) References Cited

U.S. PATENT DOCUMENTS

| | | | |
|---|---|---|---|
| 5,991,760 A | | 11/1999 | Gauvin et al. ................ 707/10 |
| 6,026,430 A | * | 2/2000 | Butman et al. ............. 709/203 |
| 6,131,096 A | | 10/2000 | Ng et al. ...................... 707/10 |
| 6,199,110 B1 | * | 3/2001 | Rizvi et al. ................. 709/227 |
| 6,446,045 B1 | * | 9/2002 | Stone et al. ................... 705/26 |
| 6,446,048 B1 | * | 9/2002 | Wells et al. ................... 705/35 |
| 6,446,109 B2 | * | 9/2002 | Gupta ........................ 709/203 |
| 6,460,041 B2 | * | 10/2002 | Lloyd .......................... 707/10 |
| 6,594,682 B2 | * | 7/2003 | Peterson et al. ............ 718/102 |

OTHER PUBLICATIONS

Voth GR et al., "Distributed Application Development for Three–Tier Architectures: Microsoft on Windows DNA" IEEE Internet Computing, vol. 2, No. 2, Mar. 1998, pp. 41–45.
Kozaczynski W, "Architecture Framework for Business Components", Software Reuse, Jun. 2, 1998, pp. 300–307.
Koschel A et al., "Configurable Event Triggered Services for CORBA–Based Systems", Enterprise Distributed Object Computing Workshop, Nov. 3, 1998, pp. 306–318.
Duffy M et al., "A Distributed Object Framework for Financial Applications", Enterprise Distributed Object Computing Workshop, Nov. 3, 1998, pp. 148–154.
"In–Memory Data Management in the Application Tier", Data Engineering, Feb. 29, 2000, pp. 637–641.

* cited by examiner

Primary Examiner—Greta Robinson
Assistant Examiner—Cheryl Lewis
(74) Attorney, Agent, or Firm—Haynes and Boone, LLP (57) ABSTRACT

Method and apparatus for database management among linked computers are disclosed. Generally, data elements are selected and retrieved from databases in one or more linked database computers and placed into memory of a linked access computer. Inputs to the access computer are used to generate proposed changes to one or more of the retrieved data elements. Proposed changes are committed to corresponding database elements in the one or more linked database computers. Database elements so manipulated may be sub-elements of objects, objects, or classes of objects.

8 Claims, 4 Drawing Sheets

DATABASE INTEGRITY IN AN INTERNET E-COMMERCE ENVIRONMENT

FIELD OF THE INVENTION

This invention relates generally to coupling communications and computing functions of software, and particularly relates to maintaining database integrity during network communications.

BACKGROUND

In the computer arts, generally there is a fundamental distinction between communication software and computing software. Computing applications such as database programs and word processors are used to create a range of data files. Communications software such as web browsers or email programs can be used to make these files available to other computers.

With the increasing use and sophistication of computers, the desirability of integrating communication software with computing software has become apparent. Problems with this integration can arise, however, in that computing environments contain a mix of topologies, such as large clients interacting with relatively smaller servers over fast networks and LANs, or slower clients interacting with larger servers over slower networks and WAN architectures. Fixed-tier architectures are generally unable to accommodate every environment. The number of tiers in an application architecture impacts practical implementation and the ability to deliver performance, scalability, flexibility, and ease of use.

SUMMARY OF THE INVENTION

In general, selected data elements are retrieved from one or more databases stored in one or more linked computers and placed into the memory of another linked computer. Inputs and program logic are used to generate proposed changes to one or more of the retrieved data elements in temporary memory. The proposed changes to the retrieved data elements are propagated to related data elements also retrieved into memory. Acceptable proposed changes and program logic are committed to corresponding database elements in the one or more linked computers. According to various aspects of the inventions, database elements may be sub-elements of objects, objects, or classes of objects.

BRIEF DESCRIPTION OF THE DRAWINGS

The accompanying drawings are incorporated into and form a part of the specification to illustrate several examples of the present inventions. These drawings together with the description serve to explain the principals of the inventions. The drawings are only for the purpose of illustrating preferred and alternative examples of how the inventions can be made and used and are not to be construed as limiting the inventions to only the illustrated and described examples. The various advantages and features of the present inventions will be apparent from a consideration of the drawings in which.

DETAILED DESCRIPTION

A web browser is a graphically oriented communication program capable of manipulating internet protocols and file formats relatively quickly. Upon receiving a URL input, the browser interprets the information contained therein concerning transfer protocol, web address, server, directory, etc. The browser then locates and communicates with a Domain Name Server (DNS) and accesses the numeric internet address of the desired file. Next, the browser establishes a connection with the internet address using the specified protocol. The server acknowledges the connection and waits. The browser requests the file from the particular subdirectory, and the server locates and sends the file. The browser now receives the web page in the form of an HTML file and begins to translate it to a visual display. During this part of the process, the browser may encounter another file, such as an embedded image for example, and it requests that file from the server as well. As the files are sent, the browser displays the web page onscreen as received using only a small fraction of the client computer's computing power to generate the display. This process involves a good deal of message exchanging between the client and the server, but very little actual computing power is used. Essentially no new information is created. All of the communication process involves the transmittal of preexisting information.

Computing software, considered generically, creates information. Data is imported, entered and manipulated using a spreadsheet, for example, or documents are created using a word processor. These programs work with files available in the computer's file system, usually main memory or disk drive. Even in the case of a LAN, additional memory beyond the immediate computer may be accessible, but not beyond predetermined limited boundaries. Preexisting information may be exchanged in this process, W but any creation of hew information occurs in the computing applications separate from communication.

The usual process for coupling communications and computing can be shown by the following example. A web page may have a form for providing specified data such as purchase order information. Information entered into the form is sent to the server, usually by clicking on a "submit" button. The server then receives a message indicating that information relating to particular fields has been submitted. The server indicates to the sending computer that it is ready to receive the information. The sending computer then sends: the information exactly as typed in the form and awaits a response. The server subsequently accepts the information and usually runs a program that performs a computation or creates a record based on the received information. The server then generates an HTML file, which may include or use the new information and sends it to the client computer. In this conventional scenario, any actual computing takes place at the server. The client communicates and displays only, and does no significant computing.

The split between communications functions and computing functions results in disadvantages in terms of lack of flexibility and time. Each exchange of information is essentially an overwriting of previous information. Maintaining database integrity is a major concern. In the case of working with a large database for example, errors can occur if contradictory information is encountered in an unanticipated context.

Efforts have been made to smooth the interface of communications and computing software by providing software, modules capable of performing simple computing tasks. These small applications, often called applets, are not complete solutions to the problems in the art. Applets are typically limited by being self-contained computation applications. That is, the traditional communication/computing architecture is retained and the applets are unable to actually read or write files on a client machine.

Multi-tier architectures are becoming increasingly common for distributing the Data manipulation tasks between client and server resources. Multi-tiered architectures are usually manifested as three tiers with the interface (GUI and browsers), application logic layer, and data server layer logically split and physically distributed among clients and one or more servers. The application logic functions as a middle tier of one or more intermediate servers also known as application servers. If need be, each application server can run on a machine separate from that which contains the database, and manages transaction processing and network communication between machines and data servers. Most of the computing tasks are performed by the application server.

The present invention is described by reference to drawings showing one or more examples of how the invention can be made and used. In these drawings, reference characters are used throughout the several views to indicate like or corresponding parts. The drawings are not necessarily representative of a tangible physical structure, especially in terms of scale and proportion. The drawings are block diagrams in which certain parts have been exaggerated to better illustrate details and features of the invention.

Figure 1:
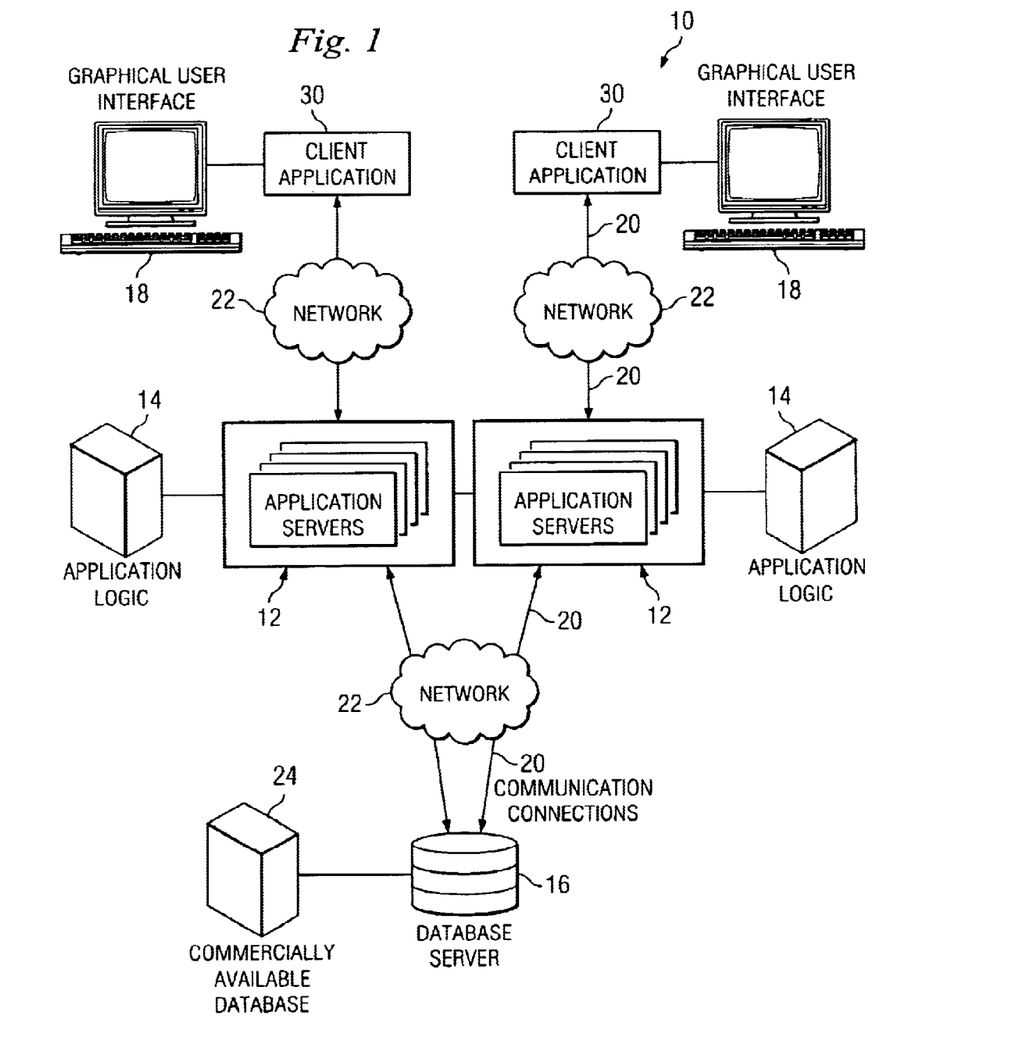
FIG. 1 is a block diagram of the database integrity system employed in a network environment.

Referring to FIG. 1, the invention utilizes a three-tier architecture 10. The invention's flexible-deployment application server 12 enables the invention to treat application logic 14 as a separate layer from the data server 16 and the graphic user interface, or GUI 18, or browser. A browser program allows a user to look through a given set of information. These components associate via communication connections 20 to one or more network 22. The invention provides access to computing functionality while maximizing the number of possible database connections. The invention may be used with commercially available databases 24, such as for example, Microsoft SQL Server, Oracle, and Sybase. The exact computers wired or wireless connections, and database software, are not crucial to the invention. The invention architecture allows maximum control over where application logic is installed. It should be understood that the invention may be deployed in a distributed environment, that is, multiple computers in a networked organization, such as in a local area network (LAN), wide area network (WAN), the internet or any combination thereof.

With the flexible deployment application server and the architecture 10 of the invention, applications using the invention leverage all components of the client/server environment: client 30; server 12; database 24; and network 22. It should be understood that the invention may be deployed in any distributed environment. The result is advantageous resource utilization and load balancing across these components. As will be further described below, the invention has several key performance-related capabilities inherent in the architecture, including: intelligent partitioning of application logic; dynamic partitioning of processing tasks; and, network traffic management.

Figure 2:
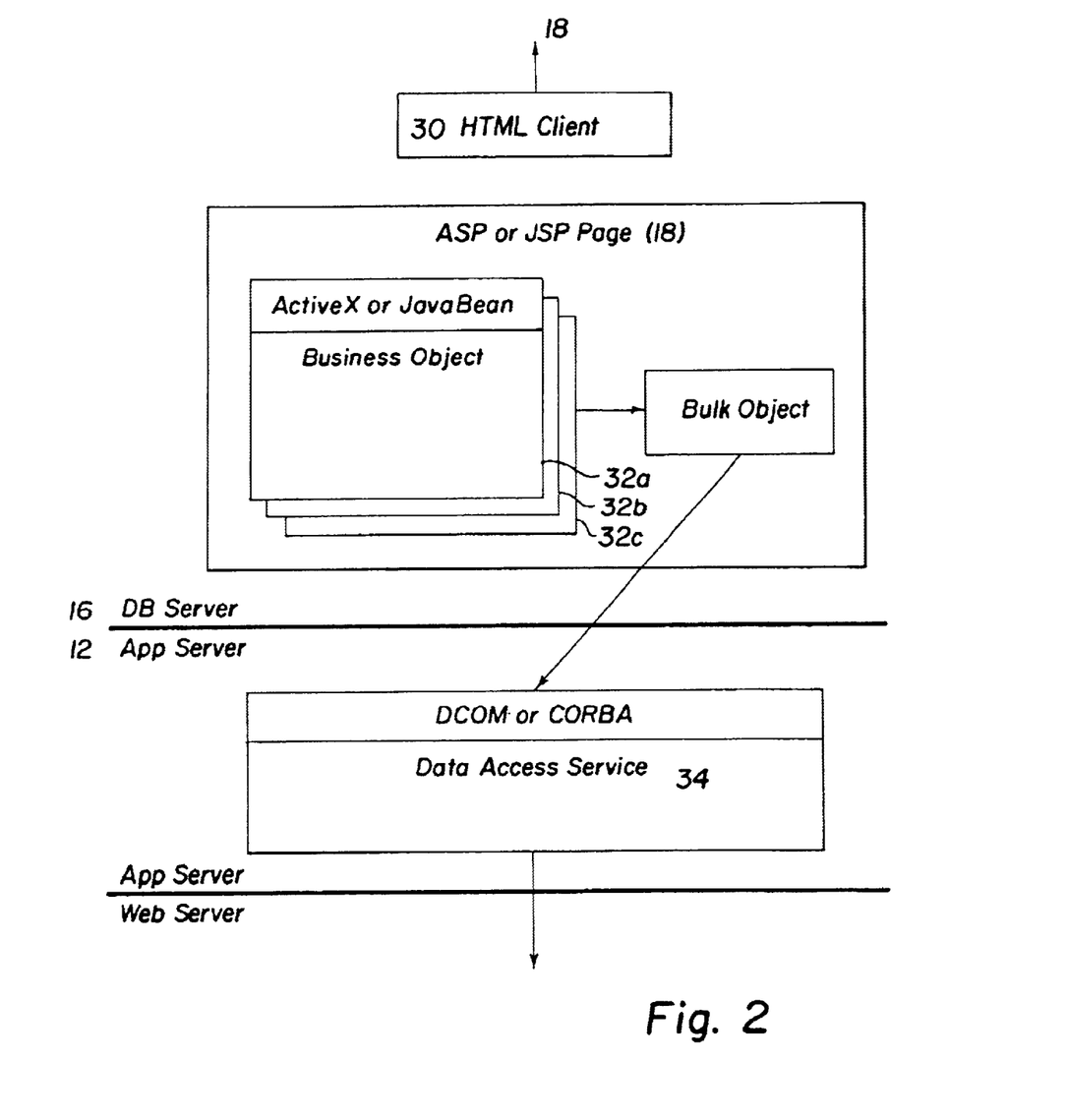
FIG. 2 is a block diagram showing portions of the system.

FIG. 2 is a block diagram showing portions of the system to an HTML client or user. A user is any computer gaining access to the network and its resources. The architecture 10 of the invention uses business objects 32 to encapsulate and package the data access and associated business logic for a particular database entity (e.g. Case, Contact, Site, Order, etc.). Business objects 32 encapsulate data access and associated business logic. It should be understood that business objects 32 contain both reference to the location of particular data in a database independent of the business object itself, and independent instructions related to the retrieval and manipulation of the particular data. Business objects 32 typically provide a set of functionality such as: retrieve, create, modify, manipulate and save data; and, perform complex business logic, for example workflow operations or activity logging. A business object 32 can contain or parent other business objects 32(a, b, c . . . n). Multiple business objects can participate in a single transaction or batch select. Initial business objects provide flexible, fine-grained control. Subsequent business objects may be used to build on initial business objects to provide higher-level, less flexible, more automated operations, such as data exchange using standard XML DTD's (Document Type Definitions). In addition to being used within other applications in the invention, business objects are provided as stand-alone components, for use in building custom applications that access the database of the invention. The business objects are components, typically ActiveX controls on the Windows platform and JavaBeans components on the Unix platform, that may be used in a container application, such as a Visual Basic application or within JScript or VBScript code in an Active Server Page on the Windows platform or within Java code in a Java Server Page on the Unix platform.

Figure 3:
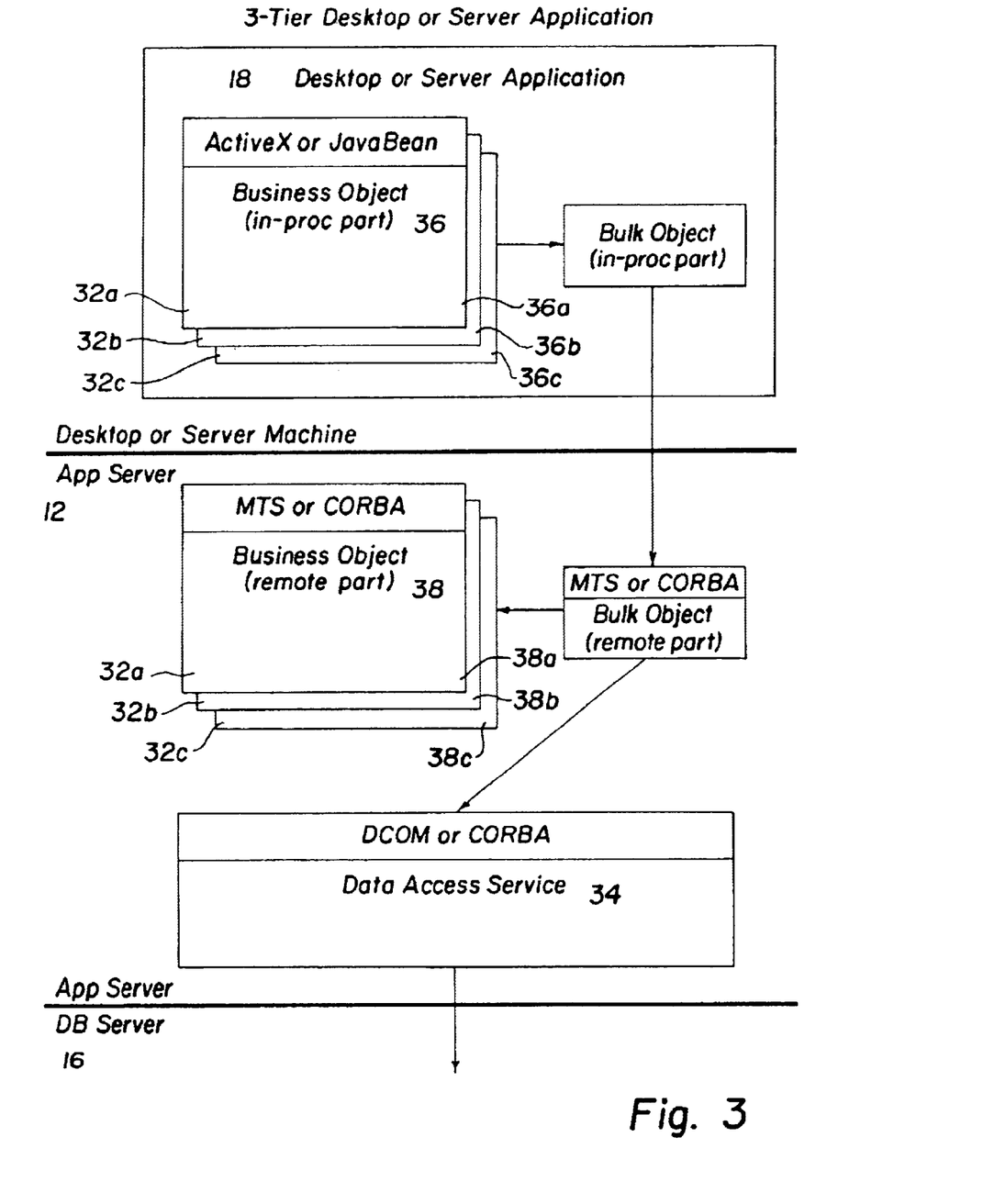
FIG. 3 is a block diagram showing the multi-threaded access of the system.

In addition to the business object components, the architecture of the invention provides a new and more efficient multithreaded data access service 34, as seen in FIG. 3. The data access service provides the following functionality: performs highly-optimized, metadata-driven SQL (structured query language) generation; communicates with database using native call level interface, for example, OLE-DB or, OC18; and, can handle multiple requests concurrently; can run in-process, or remotely, as a DCOM (distributed component object model) server on NT and a CORBA (common object request broker architecture) service on Unix.

Each business object 32 (a,b,c . . . n) has two major components, an in-process part 36 (a,b,c . . . n) and a remoteable part 38 (a,b,c . . . n). Me in-process part is a full "design-time insertable" stateful (it maintains state) scripting interface. The in-process part may be packaged as an ActiveX control on Windows platforms and as a JavaBean class on Unix platforms. The in-process part performs in-memory operations, manages the creation of remoteable parts and performs several important functions such as data caching, some business logic, such as field validation, and data binding. A remoteable part 38 provides a stateless interface (it does not hold state). The remoteable part 38 performs data access operations and other server-side business logic. The remoteable part may run in-process, or remotely, as an MTS object on NT and a CORBA object on Unix. The invention provides an advantage of efficiency of communication between in-process part and remotable part.

Business objects may be customized by writing custom logic, and attaching it to a business object of a given type (e.g. Case). This can be done by creating a COM automation object on Windows, or a Java class on Unix or Windows, that implements the event interface defined by the business object. The COM or Java object receives events from the business object, and can perform custom processing based on these events, including calling back into and manipulating the business object. It is also possible to implement additional, custom methods in the COM or Java object, and invoke them via the business object's Invoke method.

Another approach for customization is to create new objects, which contain and use business objects.

Some of the business objects represent workflow objects (for example, Case, OEQuote, and Dialogue). These business objects have methods that can be used to perform the following functions: dispatch the object to a queue; accept the object from a queue to a WIPbin; forward the object to another queue; return the object from a queue to the original owner; assign the object to a new owner; remove the object entirely from the database; or, move the object to another WIPbin. When one of these methods is invoked, the business object performs the necessary work to create activity log entries, set time bombs, change ownership, and change relations to WIPbins and queues. In addition, these business objects also have properties that identify the following: the owner of the object; the WIPbin containing the object; the queue containing the object; the queue that previously contained a temporarily accepted object; the 15 condition of the object; the activity log entries for the object; the record of status changes made to the object; and, the rejection/forwarding message for a rejected/forwarded object. Each of these properties is represented by a reference to a business object. For example, the Owner property of the Case business object is a reference to the business object representing the owner of the case. This business object contains a tabular user record for the case owner. The StatusChg property of the Case business object is a reference to the business object representing the status changes made to the case. This business object can be used to record additional status changes.

Using the concept of the invention, database relations are represented by parent-child relationships. Each business object can have a "parent" business object that is associated through a database relation. This parent-child relationship may be used to view related records. When a record in the parent business object is selected, the child business object only exposes the records that are related to the currently selected record. The parent-child relationship may also be used to establish relations between records. A record may be added to the child business object to establish a relation between that record and the currently selected record in the parent business object. For example, a Case business object can be the parent of a NotesLog business object. The parent-child relation between Case and NotesLog is defined by the case_notes2notes_log relation. This relationship facilitates viewing the notes logged against a case or to adding new notes to a case. To log new notes against the case, a new record is added to the NotesLog business object and the changes are then committed to the database.

Figure 4:
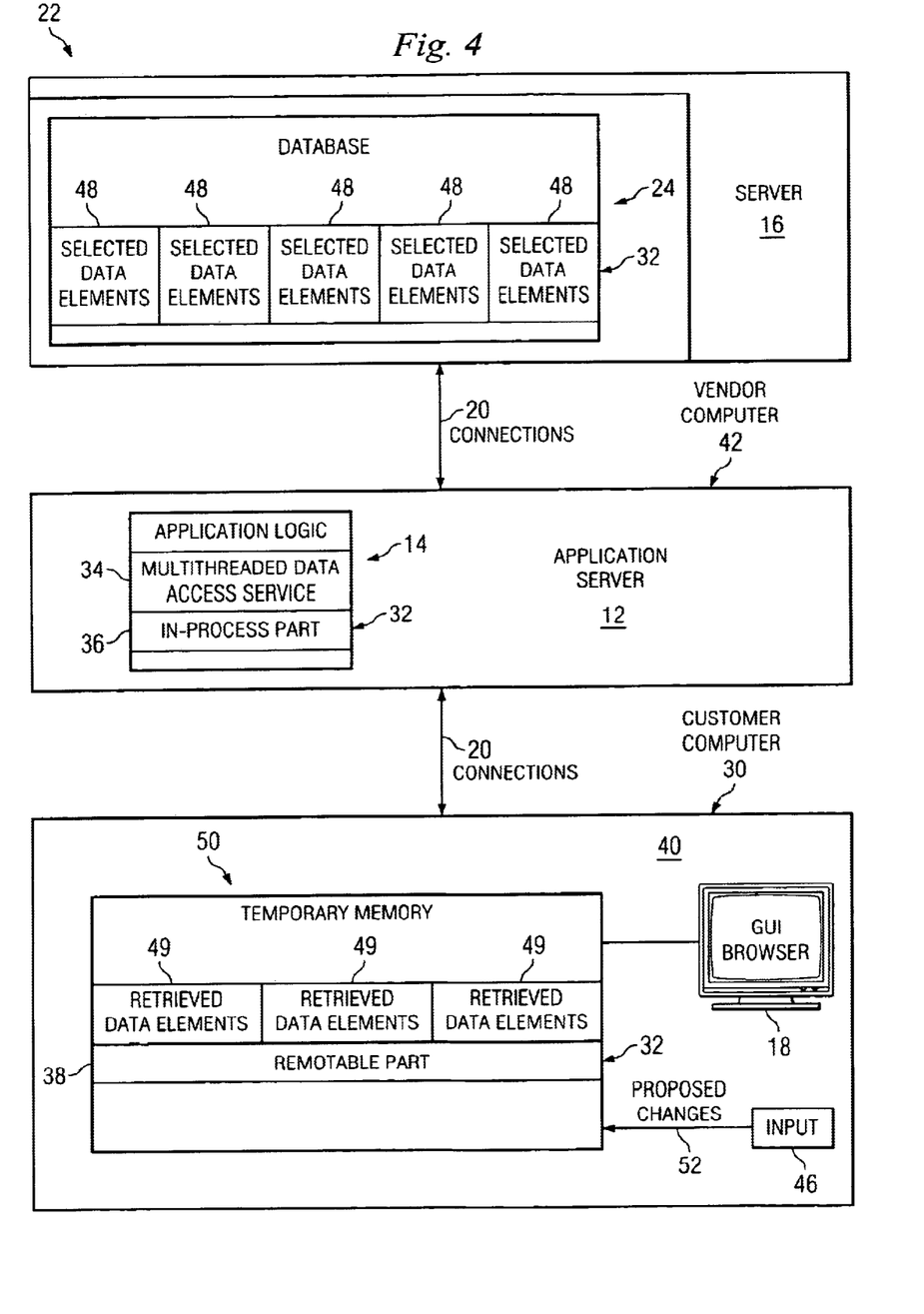
FIG. 4 is a block diagram of the database integrity system in an e-commerce application.

An example of the invention, referring primarily to FIG. 4, is shown in an e-commerce application. A customer computer 40 is linked to one or more vendor computers 42 via connections 20 forming network 22. The customer computer 40 uses a GUI browser 18 to interface between the customer computer 40 and the vendor computer 42. The application server 12 enables the application logic 14 to be treated as a separate layer from the server 16 in vendor computer 42. Business objects 32 package the data access and associated business logic. Each business object 32 has an in-process part 36 and a remotable part 38. A multi-threaded data access service 34 is provided in application server 12.

Based upon the input 46 from the customer computer, selected data elements 48 are retrieved as retrieved data elements 49 into temporary memory 50 from one or more databases 24 stored on one or more of the linked computers 42. The retrieved data elements 49 participate in business objects 32 where predetermined instructions of the remotable part 38 and inputs 46 from the customer computer 40 or in-process part 36 are used to formulate proposed changes 52 to the retrieved data elements 49 in temporary memory 50. As part of this process, additional data elements may be accessed from main memory as well.

When a predetermined indication that the customer transaction or inquiry is complete, for example an input 46 in response to a prompt, the proposed changes 52 to the retrieved data elements 49 in temporary memory 50 are committed to the corresponding database elements 48 in the one or more linked computers 42, and the communication link 20 is typically terminated.

The data elements 48 in the above process may themselves be objects or portions of objects, or classes of objects in an object-oriented database program. The process may occur in the context of a shopping cart, for example, wherein information known about the particular customer and particular inputs of the customer are used to create business objects as needed. It should be understood that information on details such as product options, volume discounts, currency conversions, previous balances and other matters may be accessed by the business objects according to the particulars of the transaction without recourse to any database in its entirety. Likewise, proposed changes are cross-referenced and retained in the business objects in temporary memory until finally approved by the customer and vendor inputs and/or instructions. When the transaction is finalized, the original database elements are revised according to need.

Among other advantages, the inventions provide advances in scalability, performance, interoperability and reporting. Scalability is important for supporting small or large-scale deployments with expanding numbers of concurrent users. Where scalability is the ability to support additional users, performance relates to the response time a user experiences when interacting with the application. Interoperability refers to the ability to interface in a variety of methods with many other applications, including database systems. The architecture supports a reporting data model that collects data without disrupting other program activities.

Two broad classifications of business objects are: the generic business object and the derived business object. The generic business object is a lower level application interface. It can be used to access/manipulate any data of the invention, including custom tables, views, fields and relations. This object does not contain higher-level business logic. The Generic business object provides: complete query, result set caching, in-memory data manipulation, and save functionality; parenting; bulking; full internationalization I18N support; and, updateable view support. An important advantage of business objects of the invention is that both the generic and the derived business objects of the invention can be used from any programming language.

A third type of business object, supporting objects, as discussed in more detail below, provide data and instructions to aid in the use of generic and derived business objects. For example, bulk objects may be created as a means to group together requests for particular business objects into a single database query. A bulk object-business object relationship is also an example of a parent-child (object) relationship.

The generic business object is a derived business object that can be used to query and update any database table using the invention. The generic business object can also be used to query database views. The generic business object has a DBObjectName property, which specifies the name of the desired database table or view. For example, if a user wanted to query or update records from table_user, the user could create a generic business object and set the DBObjectName property to "user". This business object could then be used to query and update records in that particular table.

A derived business object is a high level application interface. A derived business object typically adds higher-level business logic to a Generic business object. Derived business objects correspond to database entities such as customer information, for example: case; contact; site; order. In addition, derived business objects implement higher-level business logic by modifying inherited methods, and adding new methods, such as case.dispatch, case.aceept, case.close.

The derived business objects inherit a common set of methods, properties, and events from a base class. These methods, properties, and events facilitate manipulation of records within database tables. For example, a particular case title can be updated or retrieved. In addition to these common methods, 64 properties, and events, each business object has its own methods and properties. For example, the case object has a dispatch method for dispatching a case and a noteslog property for logging notes against a case.

Each derived business object except the supporting objects contains a recordset. The recordset contains a number of records for a given table or view. The methods and properties of the business object may be used to do the following: specify filter criteria and query the database for records; retrieve and modify data from fields in the records; commit any changes made to the records; add new records or delete existing records in the database table; establish relations between records; remove relations between records; or query the database for records related to a given record, for example, get all cases for a given contact.

Preferably, the invention provides a plurality of derived business objects as follows:

ActEntry: This business object provides access to activity log entries (records in table_act_entry). As part of the process of creating an activity entry, this business object also creates the necessary time bombs and participants related to the activity log entry. This business object can do the following: create a new activity log entry; get the activity log entries for an object; and, associate an object as a participant in an activity.

Business Org: This business object provides access to business organizations and customer accounts (records in table_bus_org), This business object can create a new business organization and get and modify information about business organizations.

Case: This business object provides access to customer cases (records in table_case). This business object can do following: create a new case; get and modify case information; get and change the contact, site, address, and installed part associated with a case; get the logs associated with a case (including phone logs, email logs, note logs, research logs, commitments) and add new logs; change the status of a case; and, close a case. Because the case is a workflow object, it can also do the following: get the activity log entries for a case; get the owner, condition, WIPbin, and queue for a case; dispatch, accept, temporarily accept, reject, forward, move, assign, and yank a case; and, record any status changes C) for a case.

CloseLog: This business object provides access to "case closure records" (records in table_close_log). As part of the process of creating the log, this business object also creates the activity log entry for the log and updates the case history. This business object can be used to create a record for closing a case or subcase (as part of the process of closing a case or subcase), and get the record of the closing of a case or subcase.

CommitLog: This business object provides access to logged commitments (records in table_commit_log). As part of the process of creating the log, this business object also creates the activity log entry for the log and updates the case history. This business object can be used to create a new commitment for a case and associate the commitment with a contact, get the commitments for a case, and get the contact associated with the commitment.

Communication: This business object provides access to incoming communications (records in table_communication). This business object can do the following: create a new inbound or outbound communication (such as an email message); associate records in table_e_addr with a communication (for example, to represent the sender, recipient, cc list, and "reply-to" email addresses in an email message); get the email addresses associated with an email message; and, get the attachments to an email message.

Contact and ContactRole: These business objects provide access to contact information (records in table_contact) and related records in table_contact_role and table_site. These business objects can do the following: create a new contact; get and modify contact information; get all sites associated with a contact and the roles that associate those sites with the contact; get and change the sites that the contact plays a role in; dissociate a contact from a site in one or more roles; and, modify the contact role.

DemandHeader and DemandDetail: These business objects provide access to part request headers and part requests (records in table_demand_hdr and table_demand_dtl). These business objects are a means to transfer information from orders (in OEQuote business objects) to part requests. These business objects can do the following: create a new part request header and part request; get the part instances that picked, received, or used to fulfill a part request; get the records of part transfers for i) fulfilling a part request; get the part number revisions specified in a part request; and, get the records of parts shipped for a part request; pick, unpick, ship, receive, fulfill, and close a part request.

Dialogue: This business object provides access to "threads" or "discussions" of incoming communications (records in table dialogue). This business object can create or get communications associated with a dialogue.

DocInst: This business object provides access to document attachments (records in table_doc_inst). This business object can create a new reference to a document attachment and get the path to a document attachment.

EmailLog: This business object provides access to logged email messages (records in table_email_log). As part of the process of creating the log, this business object also creates the activity log entry for the log and updates the case history (if logged against a case). This business object can create a new email log for a case, a subcase, or an order, and associate the email log with a contact. It can also get the email logs for a case, a subcase, or an order, and get the contact associated with the email message.

NotesLog: This business object provides access to logged notes (records in table_notes_log). As part of the process of creating the log, this business object also creates the activity log entry for the log and updates the case history (if logged against a case). This business object can create a new notes log for a case, a subcase, or an order. This business object can also get the notes logs for a case, a subcase, or an order.

OEQuote and OELineItem: These business objects provide access to orders and their line items in an online order entry system (records in table_contract and table_contr_itm). These business objects to do the following: create a new order; get and modify order information; find the orders entered by a specified contact or business organization; get the line items, primary contact, business organization, price list, currency, payment methods, billing address/billing site, and shipping address/shipping site associated with an order; add and modify line items in the order; get and modify line item information; get part number information on the part associated with the line item; add options to the line item; apply pricing adjustments (discounts/surcharges) to the line item; copy line items from another order or a "shopping list"; apply pricing adjustments (discounts/surcharges) to the order; get the logs for an order (including phone logs, email logs, and note logs) and add new logs; change the status of an order; submit and close an order. Because the order is a workflow object, it also provides the functionality for the user to: get the activity log entries for an order; get the owner, condition, WIPbin, and queue for an order; dispatch, accept, temporarily accept, reject, forward, move, assign, and yank an order; and, record any status changes for an order.

OnsiteLog; This business object provides access to onsite logs (records in table_onsite_log). As part of the process of creating the log, this business object also creates the activity log entry for the log and updates the case history. This business object can create a new onsite log for a case or subcase, and get the existing onsite logs for a case or subcase.

Part: This business object provides access to part number revision information (records in table_mod_level). This business object can get information about the part number for this revision, and get a child part under this part.

Part Price: This business object provides access to part price information (records in table_price_inst). This business object can get part price information, including currency, price list, part, quantity, and option prices for a part.

PhoneLog: This business object provides access to logged phone calls (records in table_phone_log). As part of the process of creating the log, this business object also creates the activity log entry for the log and updates the case history (if logged against a case). This business object can do the following: create a new phone log for a case, a subcase, or an order; get the phone logs for a case, a subcase, or an order; and, get the contact associated with the phone message.

ProductPart: This business object provides access to installed product parts (records in table_site_part). This business object can get information about the part number revision for this installed product part, get the activity log entries for an installed product part; get the child installed parts under this installed product part, and deinstall the part from its site.

RejectMsg: This business object provides access to rejection/forwarding messages for a workflow object (records in table_reject_msg). As part of the process of creating the message, this business object also updates the case history (if the workflow object is a case). This business object can create a rejection/forwarding message during the process of rejecting or forwarding a workflow object, and can get the particular rejection/forwarding message associated with a particular workflow object.

ResearchLog: This business object provides access to research logs (records in table_resrch_log). This business object can create a new research log for a case or a subcase, and get the research logs for a case or a subcase.

ServicePart: This business object provides access to installed service parts (records in table_site_part). This business object can do the following: get information about the part number revision for this installed service part; get the activity log entries for an installed service part; get related records from table_sit_prt_role and table_prt_prt_role; and, deinstall the part from its site n Associate or dissociate a product part with the service part (and change the role relating the product part to the service part).

ShoppingList and ShoppingListItem: These business objects provide access to saved "shopping lists" and their line items in an online order entry system (records in table_contract). These business objects can do the following: create a new shopping list; get and modify shopping list information; get the line items, primary contact, business organization, price list, and currency associated with the shopping list; add line items and options to the shopping list; create a new line item; get and modify line item information; and get part number information on the part associated with the line item.

Site: This business object provides access to site information (records in table_site). This business object can create a new site or get and modify site information, and get and change the addresses and primary business organization associated with a site, install a part at a site, and get the activity log entries for a site.

StatusChg: This business object provides access to status change records for workflow objects (records in table_status_chg). As part of the process of creating the status change record, this business object also creates the activity log entry for the status change and updates the case history (if the workflow object is a case). This business object can create a status change record during the process of changing the status of a case, subcase, or order, and can get the status change records associated with a case, subcase, or order.

Subcase: This business object provides access to subcases (records in table_subcase). This business object can do the following: create a new subcase for an existing case; get and modify subcase information; get the logs for a subcase (including phone logs, email logs, note logs, research logs, commitments, time, and expenses) and add new logs; change the status of a subcase; and, close a subcase. Because the subcase is a workflow object, it can also do the following: get the activity log entries for a subcase; get the owner, condition, WIPbin, and queue for a subcase; dispatch, accept, temporarily accept, reject, forward, move, assign, and yank a subcase; and record any status changes for a subcase.

All business objects (except the supporting objects) have internal methods, which can be invoked in each business object. The following methods are preferred.

Add: Copies a record to the business object from another business object, and relates the new record with the currently selected record in the parent business object (if any). This method can be used to create a relation between two records.

AddById: Adds an existing record in the database (identified by object ID) to the business object, and relates the record to the currently selected record in the parent business object. This method can be used to create a relation between two records.

AddNew: Adds a new record to the current business object.

Cancel: Discards any changes and new relations made to the currently selected record in the business object.

CancelAll: Discards any changes and new relations made to all exposed records in the business object.

Delete: Deletes the currently selected record from the business object and the database, discarding any changes and disassociating the record from any related records.

DeleteAll: Deletes all exposed records from the business object and the database, discarding any changes and disassociating the records from any related records.

DetachAndSave: Used in a web-based application to save a business object across web page requests.

Duplicate: Creates a copy of the currently selected record from another business object in the current business object.

Find: Finds the first record in the business object that contains a given value in a specified field. The search is performed on the currently exposed records in memory without querying the database.

IsEdited: Determines whether or not the business object contains any changes that have not been committed to the database.

MoveFirst, MoveLast, MoveNext, MovePrevious, Moverelative: These methods are used to select a different record in the business object.

Query: Queries the database using criteria specified in the business object, and returns any records found in the recordset of the business object.

RelateById: Relates the currently selected record with another record specified by object D and relation name.

Remove: Removes the currently selected record from the in-memory recordset, and disassociating the record from the currently selected record in the parent business object. Note that this does not delete the record from the database, but dissociates two related records.

RemoveAll: Removes all exposed records from the in-memory recordset, and dissociates the records from the currently selected record in the parent business object. Note that this does not delete the records from the database. This method dissociates the currently selected record in the parent business object from a set of related records.

Replace: Copies a record from another business object, replacing the currently selected record and relating the copied record with the currently selected record in the parent business object (if any). This method can be used to change the record related to the currently selected record in the parent business object.

ReplaceById: Replaces the currently selected record with an existing record in the database (identified by object ID), and relates the record to the currently selected record in the parent business object. This method can be used to change the record related to the currently selected record in the parent business object.

UnrelateAll: Dissociates the currently selected record from any records related through the specified relation.

UnrelateById: Dissociates the currently selected record from the record identified by object ID and related by the specified relation name.

Update: Commits any changes to data and relations in the currently selected record to the database.

UpdateAll. Commits any changes to data and relations in the currently exposed records to the database.

In addition to the above-described methods, all business objects (except the supporting objects) have internally encoded properties. The following properties are presently preferred.

Alias: If the QueryUsingView property is true (if the business object is being used to query a database view), specifies the viewÕs alias for the business objectÕs database table.

AutoUpdate: If true, commits any changes to the currently selected record when a different record is selected, and commits any record deletions immediately.

BOF: If true, an attempt was made to change the position of the currently selected record to a position before the first record in the recordset.

Bulk: Specifies a reference to the Bulk object for this business object.

BulkName: Specifies the name of the Bulk object for this business object. Used to change the Bulk object with which a business object is associated.

Count: Specifies the number of currently exposed records in the business object.

CurrencyForDisplay: Specifies the ÒISO 4217Ó-format currency code that determines the currency symbol and number of fractional digits used when converting a currency value to a string.

DataFields: Specifies the names of the fields that should be retrieved from the database during a query (equivalent to the SELECT clause of a SELECT statement in SQL).

DBObjectTypeId: Specifies the object type ID (from the Clarify schema) for the database table or view that the business object provides access to.

DisableEvents: If true, prevents the business object from firing any events to script code.

EOF: If true, an attempt was made to change the position of the currently selected record to a position after the last record in the recordset.

Error: Specifies a reference to the Error object that represents the last error that occurred with this business object.

Fields: Specifies a reference to the Fields object that contains a collection of the fields in the currently selected record.

Filter: Specifies the search criteria used during a query.

FilterRelated: Specifies additional search criteria, including criteria based on related records, used during a query. This criteria is used in addition to the criteria specified in the Filter property.

FormContext: Specifies a reference to the FormContext object used by the business object.

Id: Specifies the object ID of the currently selected record.

InstanceId: Specifies a unique ID (not the object ID) that identifies the business object in memory.

ParentBO: Specifies a reference to the business object that is the parent of the current business object. This property can establish a parent-child relationship between two business objects.

ParentName: Specifies the name of the business object that is the parent of the current business object. This property can establish a parent-child relationship between two business objects.

ParentRelation: Specifies the database relation that associates the current business object with its parent business object.

Position: Specifies the index (1-based) of the currently selected record in the recordset of the business object.

QueryMode: Specifies whether or not the business object should be included n database query operations.

QueryUsingView: If true, the business object is queried by using a database view (rather than a table).

Session: Specifies a reference to the Session object used by the business object.

SortOrder: Specifies the order in which the query results should be returned.

TotalCount: Specifies the total number of records (exposed and unexposed) in the recordset of the business object.

TypeName: Specifies the type of the derived business object (for example, Case or ActEntry).

UpdateMode: Specifies whether or not the business object should be included in database update operations.

All business objects (except the supporting objects) support events relating to the actions taken affecting the particular business object. Preferably, the following events are included.

FieldChanged: This event is fired when the value of a field is changed.

RowEnter: This event is fired when the record position changes (when a different record in the recordset is selected).

RowsetChanged: This event is fired when a change is made to the entire recordset (for example, if a record is added or deleted, or if a query operation is performed).

Supporting Objects are objects of the invention designed to support the business objects by providing data and instructions for items such as session archives and user interface features. The invention preferably has the following supporting objects.

Application: This object represents an attachment to a database from a process (such as a Visual Basic application or a web server running an ASP application) on a machine. The Application object allows the creation of sessions with the database and keeps the CBO DLLs in memory.

ChoiceList and Choice: The ChoiceList and Choice objects represent choice lists and list items. A choice list is an application pop-up list or a user-defined pop-up list that uses data stored in table_gbst_1st, table_gbst_elm, table_hgbst_1st, or table_hgbst_elm. The ChoiceList object provides access to the choices in the list as a collection of Choice objects. The Choice object provides access to the title, rank, state, description, and object ID of a "choice" in the list. For hierarchical lists, the Choice object also provides access to the choice list at the next level down (the list that applies to that particular choice).

Error: This object contains information on errors. When an error occurs, information about the error (such as the error number, a description of the error, and the chain of errors that resulted in the top-level error) is placed in the Error object.

Fields Collection and Field Object: The Fields collection is a collection of Field objects that represent the fields in a record. The Field object can be used to get or set the value of a field, determine if the field is associated with a choice list (an application pop-up list or user-defined pop-up list based on data stored in table_gbst_1st, table_gbst_elm, table_hgbst_1st, or table_hgbst_elm), and to get an associated choice list as a ChoiceList object.

FormContext: The FormContext object serves as an intermediary between the business objects and the following objects: session object (representing the database connection); bulk object (representing the means to group together the database requests for different business objects into a single database request). The FormContext object also provides a namespace for additional bulk objects. The business objects on a form are associated with the default bulk object for that FormContext object. Database requests from all business objects may be grouped into the same database request. Optionally, additional bulk objects can be created for the form and business objects associated with those additional bulk objects.

Session: This object represents a connection to the database and is used to log into the database. In a traditional, forms-based application (such as a Visual Basic application) where one user is using the application, the global Session object can be used to log into the database. In a web-based application (such as one using JScript or VBScript in an Active Server Page) where multiple users can use the same application, a Session object can be created for each new ASP session established between a browser and the web server. The Session object allows specification of a locale and corresponding conversion of currency, date, and numeric values to strings, based on that locale. In addition, the Session object allows access to data cached on login, such as information on the logged-in user, configuration items, and strings from table_string_db.

The embodiments shown and described above are only exemplary. This patent does not necessarily cover all the possible business objects useful with the invention. Many details are often found in the art such as: computers, languages, and database representations; methods, properties, and events. Therefore, many such details are neither shown nor described. It is not claimed that all of the details, parts, elements, or steps described and shown were invented herein. Even though numerous characteristics and advantages of the present invention have been set forth in the foregoing description, together with details of the structure and function of the invention, the disclosure is illustrative only, and changes may be made in the detail within the principles of the invention to the full extent indicated by the broad general meaning of the terms used in the attached claims.

The restrictive description and drawing of the specific examples above do not point out what an infringement of this patent would be, but are to provide at least one explanation of how to make and practice the invention. The limits of the invention and the bounds of the patent protection are measured by and defined in the following claims.

What is claimed is:

1. A method of database management comprising:
   a. establishing a communication link among an access computer and one or more database computers;
   b. running a browser on the access computer;
   c. retrieving into a memory of the access computer selected data elements from a database stored in the one or more database computers;
   d. receiving inputs into the access computer;
   e. changing the retrieved data elements in the memory of the access computer;
   f. iteratively repeating above steps c–e until the communication link between the access computer and the one or more database computers is terminated;
   g. changing the selected data elements in the one or more database computers corresponding to the changes made to the retrieved data elements in the access computer; and
   h. prompting the access computer to terminate the communication link from the one or more database computers wherein the access computer acts as a client computer.

2. A method as in claim 1 further comprising:
   retrieving logical operations from the one or more database computers into the memory of the access computer.

3. A method as in claim 1 wherein
changing the retrieved data elements in the memory of the access computer comprises performing logical operations.

4. A database management system comprising:
a. means for establishing a communication link among an access computer and one or more database computers;
b. means for running a browser on the access computer;
c. means for retrieving into a memory of the access computer, selected data elements from a database stored in the one or more database computers;
d. means for accepting inputs into the access computer;
e. means for changing the retrieved data elements in the memory of the access computer;
f. means for iteratively repeating above steps c–e until the communication link between the access computer and the one or more database computers is terminated; and
g. means for changing the selected data elements stored in the one or more database computers corresponding to the changes made to the retrieved data elements; and
h. means for prompting the access computer to terminate the communication link from the one or more database computers wherein the access computer acts as a client computer.

5. A database management system as in claim 4 wherein the selected data elements comprise objects.

6. A database management system as in claim 4 wherein the retrieved data elements in the memory of the access computer are changed by performing logical operations in the access computer.

7. A database management system as in claim 4 wherein the selected data elements comprise abstract classes.

8. A database management system of claim 4 further comprising:
means for retrieving logical operations from the one or more database computers into the memory of the access computer.

* * * * *